United States Patent
Chang (10) Patent No.: US 8,982,503 B1
(45) Date of Patent: Mar. 17, 2015

(54) DISK DRIVE GENERATING FEED-FORWARD COMPENSATION VALUE BASED ON TWO POINTS OF A SINUSOIDAL CONTROL SIGNAL

(71) Applicant: Western Digital Technologies, Inc., Irvine, CA (US)

(72) Inventor: Michael Chang, San Jose, CA (US)

(73) Assignee: Western Digital Technologies, Inc., Irvine, CA (US)

( * ) Notice: Subject to any disclaimer, the term of this patent is extended or adjusted under 35 U.S.C. 154(b) by 0 days.

(21) Appl. No.: 13/746,230

(22) Filed: Jan. 21, 2013

(51) Int. Cl.
*G11B 21/02* (2006.01)
*G11B 21/08* (2006.01)

(52) U.S. Cl.
CPC .................................... *G11B 21/08* (2013.01)
USPC ........................................................... 360/75

(58) Field of Classification Search
None
See application file for complete search history.

(56) References Cited

U.S. PATENT DOCUMENTS

| | | | |
|---|---|---|---|
| 4,616,276 A | 10/1986 | Workman | |
| 5,615,065 A * | 3/1997 | Cheung | 360/77.08 |
| 5,875,066 A * | 2/1999 | Ottesen | 360/77.11 |
| 6,128,153 A * | 10/2000 | Hasegawa et al. | 360/77.08 |
| 6,377,417 B1 | 4/2002 | Ahn | |
| 6,437,936 B1 | 8/2002 | Chen et al. | |
| 6,487,035 B1 | 11/2002 | Liu et al. | |
| 6,574,067 B2 | 6/2003 | Chen et al. | |
| 6,587,302 B2 | 7/2003 | Ahn | |
| 6,775,091 B1 | 8/2004 | Sutardja | |
| 6,819,521 B2 | 11/2004 | Ho et al. | |
| 6,859,341 B2 | 2/2005 | Min et al. | |
| 6,987,638 B1 | 1/2006 | Brunnett et al. | |
| 6,999,267 B1 | 2/2006 | Melkote et al. | |
| 7,295,397 B1 * | 11/2007 | Chang | 360/78.09 |
| 7,315,430 B2 | 1/2008 | Kisaka | |
| 7,940,489 B1 | 5/2011 | Sutardja | |

OTHER PUBLICATIONS

E. J. Davison, A. Goldenberg, "Robust Control of a General Servomechanism Problem: The Servo Compensator" Automatica, vol. 11, pp. 461-471. Pergamon Press, 1975, Printed in Great Britain.
B. A. Francis, W. M. Wonham, "The Internal Model Principle of Control Theory" Amomatica, vol. 12, pp. 457-465. Peszamon Press, 1976, Printed in Great Britain.
Marc Bodson, Alexei Sacks, and Pradeep Khosla, "Harmonic Generation in Adaptive Feedforward Cancellation Schemes" IEEE Transactions on Automatic Control, vol. 39, No. 9, Sep. 1994.

* cited by examiner

*Primary Examiner* — K. Wong (57) ABSTRACT

A disk drive is disclosed comprising a disk comprising tracks defined by servo sectors, a head, and control circuitry comprising a servo control system operable to actuate the head over the disk in response to the servo sectors. After seeking the head to a first track, a position error signal (PES) is generated representing a difference between a target location for the head and a measured location for the head. A sinusoidal control signal is generated in response to the servo sectors, and a third point of the sinusoidal control signal is generated based on a first point and second point of the sinusoidal control signal and independent of the PES, wherein the first, second and third points correspond to respective servo sectors. A feed-forward compensation value is generated based on the third point of the sinusoidal control signal using a feed-forward compensator.

30 Claims, 4 Drawing Sheets

DISK DRIVE GENERATING FEED-FORWARD COMPENSATION VALUE BASED ON TWO POINTS OF A SINUSOIDAL CONTROL SIGNAL

BACKGROUND

Disk drives comprise a disk and a head connected to a distal end of an actuator arm which is rotated about a pivot by a voice coil motor (VCM) to position the head radially over the disk. The disk comprises a plurality of radially spaced, concentric tracks for recording user data sectors and servo sectors. The servo sectors comprise head positioning information (e.g., a track address) which is read by the head and processed by a servo control system to control the actuator arm as it seeks from track to track.

Figure 1:
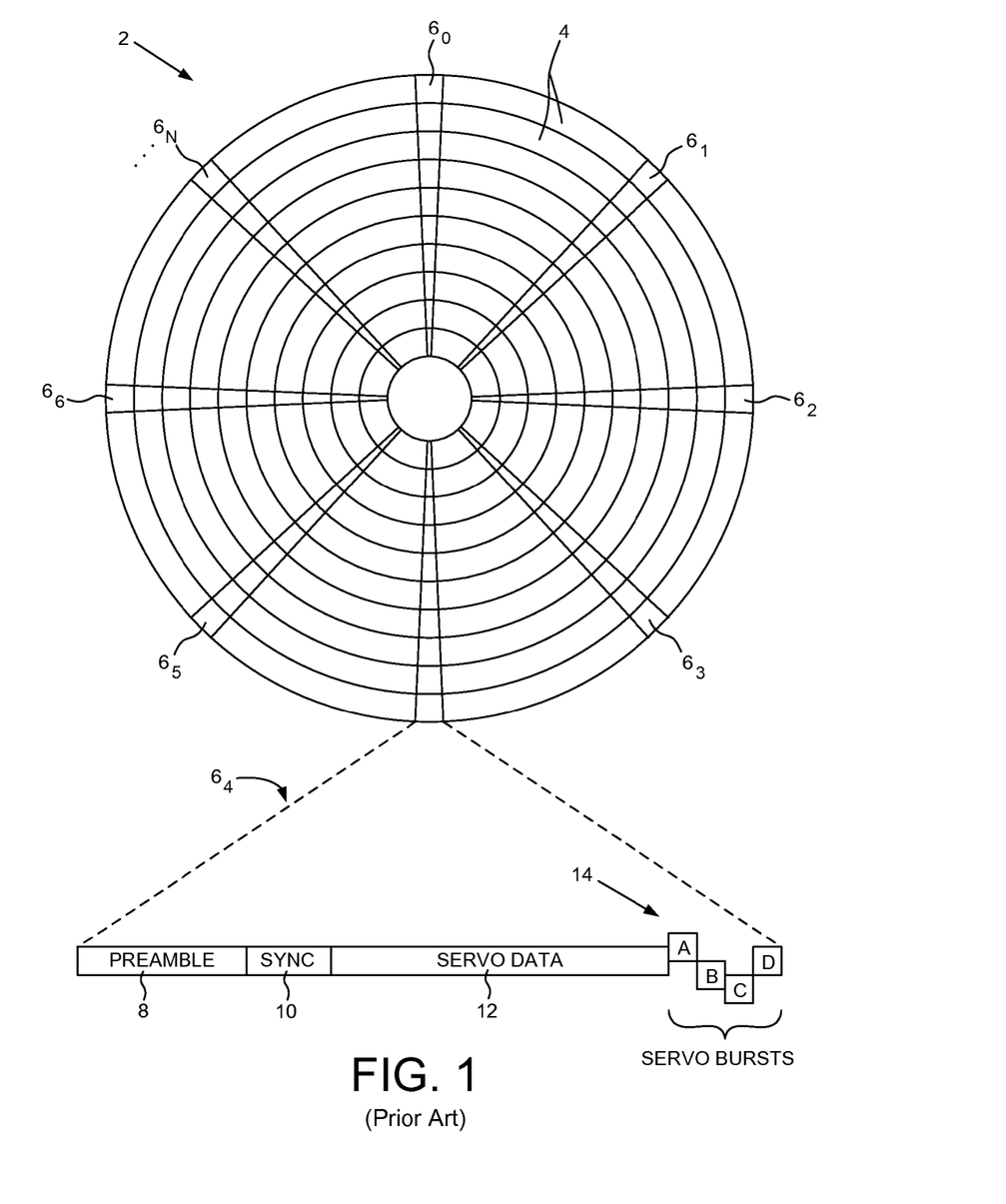
FIG. 1 shows a prior art disk format comprising a plurality of servo tracks defined by embedded servo sectors.

FIG. 1 shows a prior art disk format 2 as comprising a number of servo tracks 4 defined by servo sectors $6_0$-$6_N$ recorded around the circumference of each servo track. Each servo sector $6_i$ comprises a preamble 8 for storing a periodic pattern, which allows proper gain adjustment and timing synchronization of the read signal, and a sync mark 10 for storing a special pattern used to symbol synchronize to a servo data field 12. The servo data field 12 stores coarse head positioning information, such as a servo track address, used to position the head over a target data track during a seek operation. Each servo sector $6_i$ further comprises groups of servo bursts 14 (A, B, C, D in the example shown), which are recorded with precise intervals and offsets relative to the servo track centerlines. The servo bursts 14 provide fine head position information used for centerline tracking while accessing a data track during write/read operations.

DETAILED DESCRIPTION

Figure 2A:
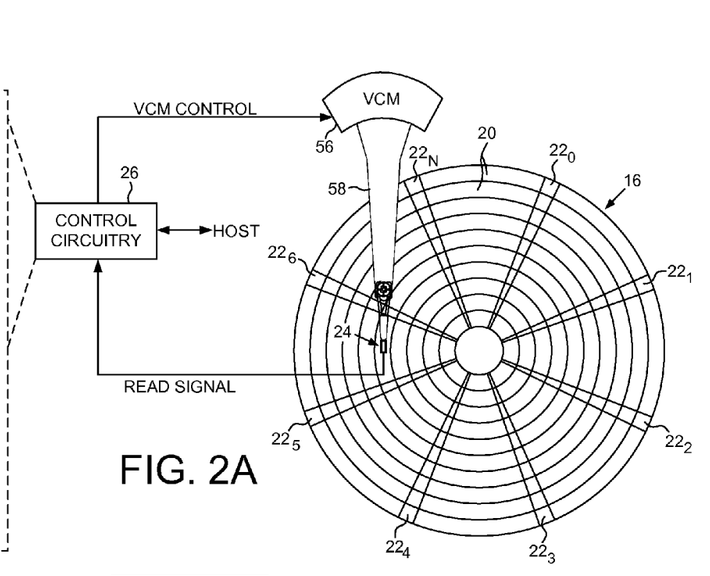
FIG. 2A shows a disk drive according to an embodiment of the present invention comprising a head actuated over a disk by a servo control system.

FIG. 2A shows a disk drive according to an embodiment of the present invention comprising a disk 16 comprising tracks 20 defined by servo sectors $22_0$-$22_N$, a head 24, and control circuitry 26 comprising a servo control system (e.g., FIG. 2B) operable to actuate the head 24 over the disk 16 in response to the servo sectors $22_0$-$22_N$. The control circuitry 26 is operable to execute the flow diagram of FIG. 2C, wherein after seeking the head to a first track (block 28), a position error signal (PES) 30 is generated representing a difference between a target location 32 for the head and a measured location 34 for the head (block 36). A sinusoidal control signal is generated in response to the servo sectors (block 38), and a third point of the sinusoidal control signal is generated based on a first point and second point of the sinusoidal control signal and independent of the PES (block 40), wherein the first, second and third points correspond to respective servo sectors. A feed-forward compensation value 42 is generated based on the third point of the sinusoidal control signal using a feed-forward compensator 44 (block 46).

Figure 2B:
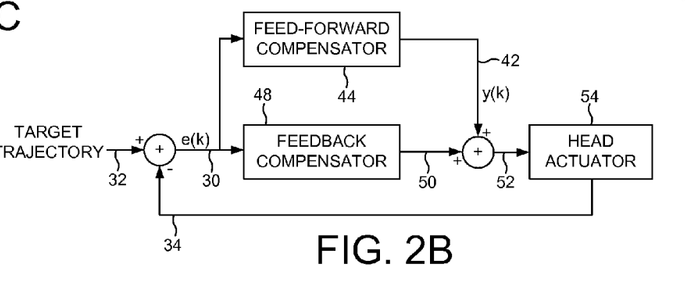
FIG. 2B shows a servo control system according to an embodiment of the present invention comprising a feed-forward compensator for generating feed-forward compensation values.
Figure 2C:
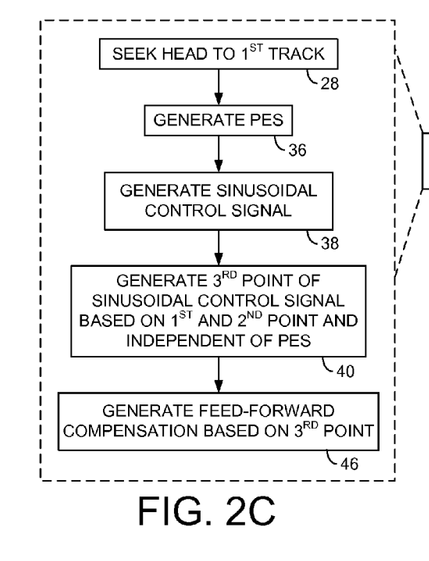
FIG. 2C is a flow diagram according to an embodiment of the present invention wherein a third point of a sinusoidal control signal is generated based on first and second points of the sinusoidal control signal.

Any suitable servo control system may be employed in the embodiments of the present invention. In the embodiment of FIG. 2B, a feedback compensator 48 processes the PES 30 to generate a control signal 50 that is modified by the feed-forward compensation value 42 to generate a control signal 52 applied to an actuator 54 for actuating the head 24 radially over the disk 16. Any suitable actuator 54 may be employed, such as a voice coil motor 56 that rotates an actuator arm 58 about a pivot in order to actuate the head 24 radially over the disk 16. In another embodiment, the actuator 54 may further comprise a suitable microactuator (e.g., piezoelectric actuator) for actuating a suspension relative to the actuator arm 58, or actuating a slider relative to the suspension.

In one embodiment, the feed-forward compensator 44 compensates for one or more repeatable disturbances in the PES 30 due, for example, to a repeatable runout (RRO) of the disk 16. The RRO of the disk 16 may be caused by a written-in error when writing the servo sectors $22_0$-$22_N$ to the disk 16, or an eccentricity due to a misalignment when clamping the disk 16 to a spindle motor that rotates the disk 16. In one embodiment, the feed-forward compensator 44 may compensate for any suitable frequency of the repeatable disturbance, such as the fundamental frequency (disk rotation frequency) and/or harmonics of the fundamental frequency.

In one embodiment, the feed-forward compensator 44 generates the feed-forward compensation values 42 according to a z-domain transfer function:

$$\frac{\tau z + \gamma}{z^2 - 2\cos(\omega T)z + 1} \qquad \text{Eq. 1}$$

where T represents a sampling period of the servo sectors, $\omega$ represents a target frequency (e.g., the fundamental or harmonic of RRO), and $\tau$ and $\gamma$ are learning coefficients. The above transfer function of Eq. 1 can be implemented in any suitable manner, including a Direct Form I or a Direct Form II difference equation as described in the embodiments below.

In one embodiment, the feed-forward compensator 44 generates the feed-forward compensation values y(k) 42 based on a Direct Form I difference equation that implements the above transfer function of Eq. 1 according to:

$$y(k) = 2\cos(\omega T)^* y(k-1) - y(k-2) + \tau e(k-1) + \gamma e(k-2) \qquad \text{Eq. 2}$$

where T represents a sampling period of the servo sectors, $\omega$ represents a target frequency (e.g., the fundamental or harmonic of RRO), e represents an error signal of the servo control system (e.g., the PES 30), and $\tau$ and $\gamma$ are learning coefficients.

In embodiments of the present invention, it may be desirable to disable the learning mode of Eq. 2 such as while the head is tracking on a first track during certain modes, or while the head is seeking to a second track. For example, when the head is seeking to a second track the error signal (e.g., the PES 30) may not represent the repeatable disturbance in a form useful for adapting the feed-forward compensation values 42; however, it may still be desirable to generate the feed-forward compensation values 42 while the learning mode of Eq. 2 is disabled. The learning mode may be disabled in Eq. 2 by setting the learning coefficients $\tau$ and $\gamma$ to zero, or by setting the error signal e to zero. However, due to a quantization error inherent in computing the cosine in Eq. 2, the equation may eventually become unstable if the learning mode is disabled for an extended number of servo sectors.

To overcome the instability problem of Eq. 2, in one embodiment the control circuitry is operable to generate a third point of the sinusoidal control signal according to:

$$y(k+n)=\theta(y_j\sin(\omega T(i+n))-y_i\sin(\omega T(j+n))) \quad \text{Eq. 3}$$

where y(k+n) represents the third point, $\theta=\csc((i-j)\omega T)$ where $(i-j)\omega T$ does not equal $m\pi$ and m is an integer, $y_i$ represents the first point, $y_j$ represents the second point, represents a phase of the first point, and j represents a phase of the second point. The above Eq. 3 generates the third point independent of the error signal (e.g., independent of the PES) and does not exhibit the instability problem of Eq. 2. Accordingly, the above Eq. 3 can be used to generate the feed-forward compensation values 42 when Eq. 2 may otherwise become unstable due to disabling the learning mode.

Figure 3:
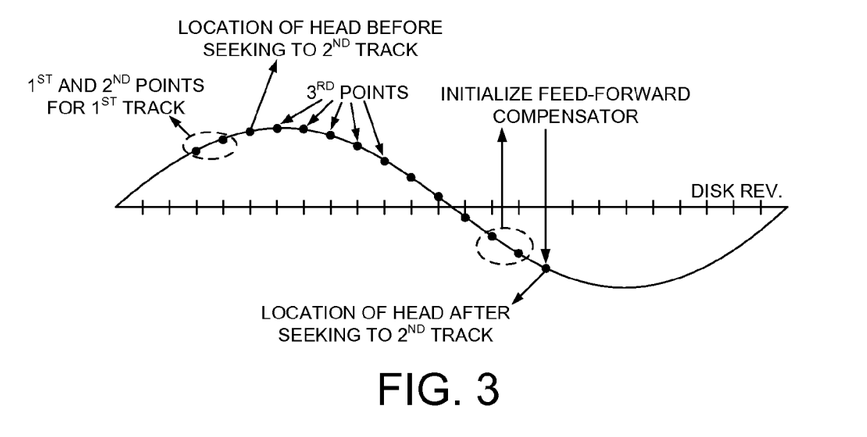
FIG. 3 illustrates an embodiment of the present invention wherein feed-forward compensation values are generated independent of the position error signal (PES) during a seek operation.

FIG. 3 illustrates operation of Eq. 2 with the learning mode enabled, as well as Eq. 3 for generating the third points during a seek operation. The x-axis in FIG. 3 represents one revolution of the disk where each hash mark represents a servo sample (a servo sector). The y-axis in FIG. 3 represents the magnitude of the sinusoidal control signal relative to the servo sectors, and the phase of the sinusoidal control signal is represented by both the x-axis and the y-axis. In the example of FIG. 3, the sinusoidal control signal represents the fundamental frequency of the repeatable disturbance (i.e., the period of the sinusoidal control signal equals the period of a disk revolution).

During a normal tracking operation while tracking the first track, the above Eq. 2 is used to generate the points of the sinusoidal control signal shown in FIG. 3, wherein the feed-forward compensation values 42 are generated based on the sinusoidal control signal (and in this embodiment the feed-forward compensation values 42 equal the points of the sinusoidal control signal). The above Eq. 2 adapts the feed-forward compensation values 42 so as to reduce the corresponding frequency component in the error signal e (e.g., the PES 30). When the servo control system transitions into a seek mode in order to seek the head to a second track, two points of the sinusoidal control signal are used to generate the third points y(k+n) of the sinusoidal control signal using Eq. 3 as the head seeks from the first track to the second track. In the example shown in FIG. 3, the first and second points $y_i$ and $y_j$ correspond to the points generated at servo sectors k−1 and k−2 when the head is at servo sector k just prior to the seek. The phase i and j of the two points $y_i$ and $y_j$ is represented by the phase of the corresponding servo sectors relative to the rotation phase of the disk. Although the example of FIG. 3 uses first and second points at time k−1 and k−2, any two points of the sinusoidal control signal may be used in the above Eq. 3 to generate the third points.

As shown in FIG. 3, the third points of the sinusoidal control signal are generated using Eq. 3 during the seek until the head reaches the second track. When the head reaches the second track (at arbitrary servo sector k), the previous two points at times k−1 and k−2 (generated using Eq. 3) are used to initialize Eq. 2 (i.e., used to initialize the feed-forward compensator 44). The feed-forward compensation values 42 are then generated using Eq. 2 including to adapt the feed-forward compensation values 42 while tracking the second track based on the error signal e.

In one embodiment, it may be desirable to measure an amplitude and/or phase of the sinusoidal control signal (e.g., the sinusoidal control signal shown in FIG. 3).

Figure 4:
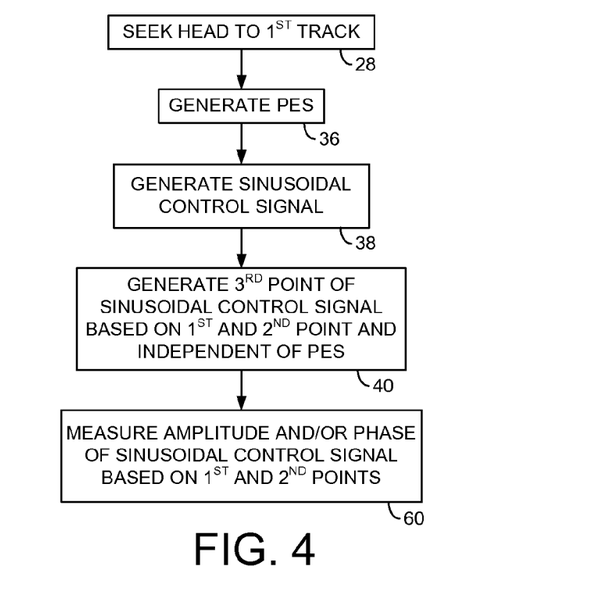
FIG. 4 is a flow diagram according to an embodiment of the present invention wherein an amplitude and/or phase of the sinusoidal control signal is measured based on the first and second points of the sinusoidal control signal.

FIG. 4 is a flow diagram according to an embodiment of the present invention which extends on the flow diagram of FIG. 2B, wherein an amplitude and/or phase of the sinusoidal control signal is measured based on first and second points of the sinusoidal control signal (block 60). In one embodiment, the amplitude of the sinusoidal control signal is generated based on the Direct Form I difference equation of Eq. 2 according to:

$$|\theta|\sqrt{y_i^2+y_j^2-2y_iy_j\cos((i-j)\omega T)} \quad \text{Eq. 4}$$

where $\theta=\csc((i-j)\omega T)$ where $(i-j)\omega T$ does not equal $m\pi$ and m is an integer, $y_i$ represents the first point, $y_j$ represents the second point, represents a phase of the first point, and j represents a phase of the second point. In one embodiment, the phase of the sinusoidal control signal (at time k) is generated based on the Direct Form I difference equation of Eq. 2 according to:

$$\arctan\left(\frac{\theta(y_j\sin(i\omega T)-y_i\sin(j\omega T))}{\theta(y_j\cos(i\omega T)-y_i\cos(j\omega T))}\right) \quad \text{Eq. 5}$$

where $\theta=\csc((i-j)\omega T)$ where $(i-j)\omega T$ does not equal $m\pi$ and m is an integer, $y_i$ represents the first point, $y_j$ represents the second point, represents a phase of the first point, and j represents a phase of the second point. The above arctan function of Eq. 5 computes the phase of the sinusoidal control signal for the quadrant that the first and second points are located. The actual phase is then generated by adding the appropriate offset based on the quadrant (i.e., by adding 0, $\pi/2$, $\pi$, or $3\pi/2$).

In another embodiment, the feed-forward compensator 44 generates the feed-forward compensation values y(k) 42 based on a Direct Form II difference equation that implements the above transfer function of Eq. 1 according to:

$$w(k)=e(k)+2\cos(\omega T)w(k-1)-w(k-2)$$

$$y(k)=\tau w(k-1)+\gamma w(k-2) \quad \text{Eq. 6}$$

where T represents a sampling period of the servo sectors, $\omega$ represents a target frequency, e represents an error signal of the servo control system, and $\tau$ and $\gamma$ are learning coefficients. In the above Eq. 6, the sinusoidal control signal represents an interim signal w(k) used to generate the feed-forward compensation values y(k) 42. The above Eq. 6 may exhibit the same instability problem as the above Eq. 2, and therefore an alternative equation is used to generate the third points of the sinusoidal control signal when the learning mode of Eq. 6 is disabled (e.g., during a seek as shown in FIG. 3).

In one embodiment, the control circuitry is operable to generate the third points of the sinusoidal control signal according to:

$$w(k+n)=\theta(w_j\sin(\omega T(i+n))-w_i\sin(\omega T(j+n))) \quad \text{Eq. 7}$$

where w(k+n) represents the third point, $\theta=\csc((i-j)\omega T)$ where $(i-j)\omega T$ does not equal $m\pi$ and m is an integer, $w_i$ represents the first point, $w_j$ represents the second point, i represents a phase of the first point, and j represents a phase of the second point. The above Eq. 7 generates the third point independent of the error signal (e.g., independent of the PES) and does not exhibit the instability problem of Eq. 6. Accordingly, the above Eq. 7 can be used to generate the feed-forward compensation values 42 when Eq. 6 may otherwise become unstable due to disabling the learning mode.

In one embodiment, the amplitude of the sinusoidal control signal is generated based on the Direct Form II difference equation of Eq. 6 according to:

$$v|\theta|\sqrt{w_i^2 + w_j^2 - 2w_iw_j\cos((i-j)\omega T)} \qquad \text{Eq. 8}$$

where $\theta=\csc((i-j)\omega T)$ where $(i-j)\omega T$ does not equal $m\pi$ and m is an integer, $$v = \sqrt{\tau^2 + \gamma^2 + 2\tau\gamma\cos(\omega T)},$$

$w_i$ represents the first point, $w_j$ represents the second point, represents a phase of the first point, and j represents a phase of the second point. In one embodiment, the phase of the sinusoidal control signal (at time k) is generated based on the Direct Form II difference equation of Eq. 6 according to:

$$\arctan\left(\frac{\theta(w_j\xi_{i,0}^s - w_i\xi_{j,0}^s)}{\theta(w_j\xi_{i,0}^c - w_i\xi_{j,0}^c)}\right) \qquad \text{Eq. 9}$$

where $\theta=\csc((i-j)\omega T)$ where $(i-j)\omega T$ does not equal $m\pi$ and m is an integer, $$\begin{bmatrix} \xi_{q,r}^s \\ \xi_{q,r}^c \end{bmatrix} = \begin{bmatrix} \tau\sin(\omega T(q-1)+r) + \gamma\sin(\omega T(q-2)+r) \\ \tau\cos(\omega T(q-1)+r) + \gamma\cos(\omega T(q-2)+r) \end{bmatrix},$$

$w_i$ the first point, $w_j$ represents the second point, i represents a phase of the first point, and j represents a phase of the second point.

Embodiments of the present invention may implement the transfer function of Eq. 1 using equations other than the Direct Form I or Direct Form II difference equations described above. In addition, the above equations that are based on the Direct Form I and Direct Form II difference equations may be implemented in any suitable manner, including using any suitable transformation that may simplify the implementation. In one embodiment, the above Eq. 3 and Eq. 7 may be implemented according to:

$$y(k+n) = v_s\sin(n\omega T) + v_c\cos(n\omega T) \qquad \text{Eq. 10}$$

where for the Direct Form I of Eq. 3:

$$v_c = \theta(y_j\sin(i\omega T) - y_i\sin(j\omega T))$$

$$v_s = \theta(y_j\cos(i\omega T) - y_i\cos(j\omega T)) \qquad \text{Eq. 11}$$

and for the Direct Form II of Eq. 7:

$$(v_c, v_s) = \theta(w_j\xi_{i,0}^s - w_i\xi_{j,0}^s, w_j\xi_{i,0}^c - w_i\xi_{j,0}^c) \qquad \text{Eq. 12}$$

The magnitude of the sinusoidal control signal may be generated at any k+n according to $$\sqrt{v_c^2 + v_s^2}$$

and the phase according to arctan $$\left(\frac{v_c}{v_s}\right)$$

with $$y(k+n) = \sqrt{v_c^2 + v_s^2}\sin\left(n\omega T + \arctan\left(\frac{v_c}{v_s}\right)\right) \qquad \text{Eq. 13}$$

With j=0 the equivalent of the above Eq. 3 may be computed with:

$$(v_c, v_s) = (y(k), \csc(i\omega T)(y(k)\cos(i\omega T) - y(k-i))) \qquad \text{Eq. 14}$$

With i=2 and j=1, the equivalent of the above Eq. 7 may be computed with:

$$v_c = \gamma w_2 + \tau w_1$$

$$v_s = \theta(\gamma w_1 - \tau w_2 + (\tau w_1 - \gamma w_2)\cos(\omega T)) \qquad \text{Eq. 15}$$

Yet another transformation of Eq. 3 and Eq. 7 may be derived by considering arbitrary values of $\rho$ and $\phi$ where for the Direct Form I, let $y(k,\phi)=\rho\cos(k\omega T+\phi)$ then:

$$(v_c, v_s) = \rho(\cos(k\omega T+\phi), -\sin(k\omega T+\phi)) \qquad \text{Eq. 16}$$

For the Direct Form II, let $w(k,\phi)=\rho\cos(k\omega T+\phi)$ then:

$$(v_c, v_s) = \rho(\xi_{k,\phi}^c - \xi_{k,\phi}^s) \qquad \text{Eq. 17}$$

For both Direct Form I and Direct Form II, $v_c$ and $v_s$ are related to the sinusoidal feed-forward compensation values y(k) by:

$$(v_c, v_s) = (y(k,\phi), y(k,\phi+\pi/2)) \qquad \text{Eq. 18}$$

In one embodiment of the present invention, the magnitude and/or phase of the repeatable disturbance may vary based on the radial location of the head. To compensate for this variation, in one embodiment the tracks 20 of FIG. 2A are grouped together to define a plurality of zones, wherein a different sinusoidal control signal may be generated for each zone to compensate for the difference in the repeatable disturbance. In one embodiment, the control circuitry 26 saves two points of the sinusoidal control signal for each zone, wherein the two points of each zone are used to initialize the feed-forward compensator 44 when the head seeks into a different zone.

Figure 5A:
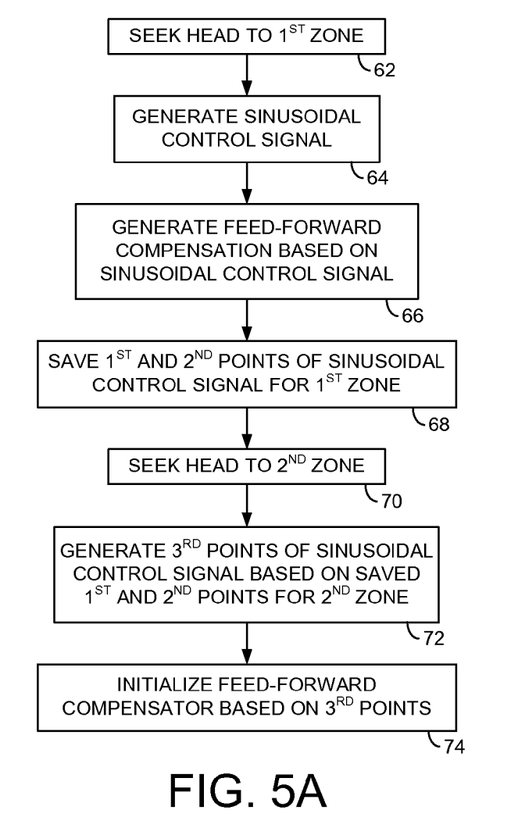
FIG. 5A is a flow diagram according to an embodiment of the present invention wherein when seeking from a first to second zone, the saved first and second points of the servo control signal for the second zone are used to seek the head and/or initialize the feed-forward compensator.
Figure 5B:
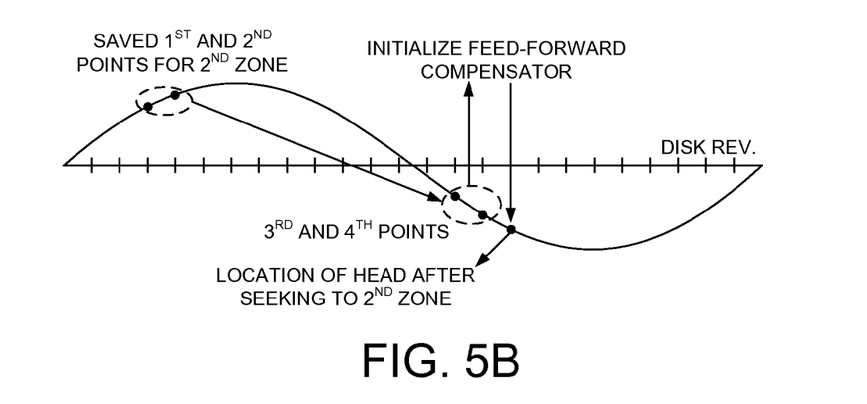
FIG. 5B illustrates how the saved first and second points for a second zone may be utilized to seek the head and/or initialize the feed-forward compensator according to an embodiment of the present invention.

This embodiment is understood with reference to the flow diagram of FIG. 5A and as illustrated by the example of FIG. 5B. After seeking the head to a first zone (block 62) and initializing the feed-forward compensator with the two points saved for the first zone, the sinusoidal control signal is generated in response to the servo sectors (block 64). The feed-forward compensation values are generated based on the sinusoidal control signal (block 66), including to adapt the sinusoidal control signal and the corresponding feed-forward compensation values (e.g., using Eq. 2 or Eq. 6). Prior to the head seeking out of the first zone, two points of the adapted sinusoidal control signal are saved (block 68) and used to initialize the feed-forward compensator when the head returns to the first zone. The control circuitry then seeks the head from the first zone to a second zone (block 70), generates third points of the sinusoidal control signal based on the saved first and second points for the second zone (block 72), and initializes the feed-forward compensator based on the third points (block 74).

In one embodiment, while seeking the head from the first zone to the second zone the third points of the sinusoidal control signal are generated as described above with reference to FIG. 3 (i.e., using Eq. 3 or Eq. 7). The sinusoidal control signal used to generate the third points of FIG. 3 may correspond to the first or second zone. For example, in one embodiment the sinusoidal control signal used to generate the third points of FIG. 3 may correspond to the first zone. The third points may be generated based on the first zone up until the head crosses the zone boundary, or until the head reaches the target track within the second zone. In yet another embodiment, the sinusoidal control signal used to generate the third points during the seek may correspond to the second zone. That is, the first and second points saved for the second zone may be used to generate the third points of FIG. 3 (e.g., using Eq. 3 or Eq. 7) throughout the entire seek operation from the first zone to the second zone.

The phase of the first and second points saved for each zone does not affect the ability to generate the third points during the seek, or to initialize the feed-forward compensator after the seek. As described above, in one embodiment the first and second points are saved when the head seeks away from a current zone, and therefore the saved first and second points may have any arbitrary phase. In the example shown in FIG. 5B, the first and second points saved for the second zone have an arbitrary phase with respect to the phase of the head after it reaches the target track within the second zone at the end of the seek. Regardless as to the phase of the first and second points, the third and fourth points of the sinusoidal control signal shown in FIG. 5B can be generated based on the first and second points (e.g., using Eq. 3 or Eq. 7), wherein the third and fourth points are used to initialize the feed-forward compensator at the end of the seek operation. If the sinusoidal control signal for the second zone is used to generate the third points of FIG. 3 during the seek to the second zone, then the third and fourth points shown in FIG. 5B will already have been generated at the end of the seek operation. If the sinusoidal control signal for the first zone is used to generate the third points of FIG. 3 during the seek to the second zone, then the third and fourth points shown in FIG. 5B are generated using the first and second saved points for the second zone (independent of the seek operation). After initializing the feed-forward compensator, the sinusoidal control signal and feed-forward compensation values are adapted (e.g., using Eq. 2 or Eq. 6), and then two of the adapted points of the sinusoidal control signal are saved when the head seeks away from the second zone.

Any suitable control circuitry may be employed to implement the flow diagrams in the embodiments of the present invention, such as any suitable integrated circuit or circuits. For example, the control circuitry may be implemented within a read channel integrated circuit, or in a component separate from the read channel, such as a disk controller, or certain operations described above may be performed by a read channel and others by a disk controller. In one embodiment, the read channel and disk controller are implemented as separate integrated circuits, and in an alternative embodiment they are fabricated into a single integrated circuit or system on a chip (SOC). In addition, the control circuitry may include a suitable preamp circuit implemented as a separate integrated circuit, integrated into the read channel or disk controller circuit, or integrated into a SOC.

In one embodiment, the control circuitry comprises a microprocessor executing instructions, the instructions being operable to cause the microprocessor to perform the flow diagrams described herein. The instructions may be stored in any computer-readable medium. In one embodiment, they may be stored on a non-volatile semiconductor memory external to the microprocessor, or integrated with the microprocessor in a SOC. In another embodiment, the instructions are stored on the disk and read into a volatile semiconductor memory when the disk drive is powered on. In yet another embodiment, the control circuitry comprises suitable logic circuitry, such as state machine circuitry.

What is claimed is:

1. A disk drive comprising:
   a disk comprising tracks defined by servo sectors;
   a head; and
   control circuitry comprising a servo control system operable to actuate the head over the disk in response to the servo sectors, the servo control system operable to:
   seek the head to a first track;
   generate a position error signal (PES) representing a difference between a target location for the head and a measured location for the head;
   adapt a sinusoidal control signal in response to the PES;
   disable the adapting of the sinusoidal control signal;
   while the adapting is disabled, generate a third point of the sinusoidal control signal based on a first point and second point of the sinusoidal control signal, wherein the first, second and third points correspond to respective servo sectors; and
   generate a feed-forward compensation value based on the third point of the sinusoidal control signal using a feed-forward compensator.

2. The disk drive as recited in claim 1, wherein the third point of the sinusoidal control signal corresponds to the feed-forward compensation value generated while tracking the first track.

3. The disk drive as recited in claim 1, wherein the third point of the sinusoidal control signal corresponds to the feed-forward compensation value generated while seeking the head to a second track.

4. The disk drive as recited in claim 1, wherein:
   the tracks are grouped together to define a plurality of zones, including a first zone and a second zone;
   the first track is located in the first zone, a second track is located in the second zone, and a third track is located in the first zone;
   the first and second points correspond to the first track prior to seeking the head from the first track to the second track; and
   the control circuitry is further operable to:
   seek the head from the second track to the third track; and
   initialize the feed-forward compensator based on the third point.

5. The disk drive as recited in claim 1, wherein the feed-forward compensator is operable to generate the feed-forward compensation value y(k) according to:

$$y(k)=2\cos(\omega T)^* y(k-1)-y(k-2)+\tau e(k-1)+\gamma e(k-2)$$

where:
T represents a sampling period of the servo sectors;
$\omega$ represents a target frequency;
e represents an error signal of the servo control system; and
$\tau$ and $\gamma$ are learning coefficients.

6. The disk drive as recited in claim 5, wherein the control circuitry is operable to generate the third point according to:

$$y(k+n)=\theta(y_j \sin(\omega T(i+n))-y_i \sin(\omega T(j+n)))$$

where:
y(k+n) represents the third point;
$\theta=\csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

7. The disk drive as recited in claim 3, wherein the control circuitry is operable to generate the third point according to:

$$y(k+n)=\theta(y_j\sin(\omega T(i+n))-y_i\sin(\omega T(j+n)))$$

where:
y(k+n) represents the third point;
$\theta=\csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

8. The disk drive as recited in claim 4, wherein the control circuitry is operable to initialize the feed-forward compensator by computing the third point according to:

$$y(k+n)=\theta(y_j\sin(\omega T(i+n))-y_i\sin(\omega T(j+n)))$$

where:
y(k+n) represents the third point;
$\theta=\csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

9. The disk drive as recited in claim 1, wherein the control circuitry is further operable to measure an amplitude of the sinusoidal control signal based on at least two points of the sinusoidal control signal.

10. The disk drive as recited in claim 5, wherein the servo control system is operable to measure an amplitude of the sinusoidal control signal according to:

$$|\theta|\sqrt{y_i^2+y_j^2-2y_iy_j\cos((i-j)\omega T)}$$

where:
$\theta=\csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

11. The disk drive as recited in claim 1, wherein the control circuitry is further operable to measure a phase of the sinusoidal control signal based on at least two points of the sinusoidal control signal.

12. The disk drive as recited in claim 5, wherein the servo control system is operable to measure a phase of the sinusoidal control sianal according to:

$$\arctan\left(\frac{\theta(y_j\sin(i\omega T)-y_i\sin(j\omega T))}{\theta(y_j\cos(i\omega T)-y_i\cos(j\omega T))}\right)$$

where:
$\theta=\csc((i\,j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

13. The disk drive as recited in claim 1, wherein the feed-forward compensator is operable to generate the feed-forward compensation values y(k) according to:

$$w(k)=e(k)+2\cos(\omega T)w(k-1)-w(k-2)$$

$$y(k)=\tau w(k-1)+\gamma w(k-2)$$

where:
T represents a sampling period of the servo sectors;
$\omega$ represents a target frequency;
e represents an error signal of the servo control system; and
$\tau$ and $\gamma$ are learning coefficients.

14. The disk drive as recited in claim 13, wherein the control circuitry is operable to generate the third point according to:

$$w(k+n)=\theta(w_j\sin(\omega T(i+n))-w_i\sin(\omega T(j+n)))$$

where:
w(k+n) represents the third point;
$\theta=\csc((i-j)\omega T)$ where $(i-j)\omega T$ does not equal $m\pi$ and m is an integer;
$w_i$ represents the first point;
$w_j$ represents the second point;
i represents a phase of the first point; and
j represents a phase of the second point.

15. The disk drive as recited in claim 3, wherein the control circuitry is operable to generate the third point according to:

$$w(k+n)=\theta(w_j\sin(\omega T(i+n))-w_i\sin(\omega T(j+n)))$$

where:
w(k+n) represents the third point;
$\theta=\csc((i-j)\omega T)$ where $(i-j)\omega T$ does not equal $m\pi$ and m is an integer;
$w_i$ represents the first point;
$w_j$ represents the second point;
i represents a phase of the first point; and
j represents a phase of the second point.

16. The disk drive as recited in claim 4, wherein the control circuitry is operable to initialize the feed-forward compensator by computing the third point according to:

$$w(k+n)=\theta(w_j\sin(\omega T(i+n))-w_i\sin(\omega T(j+n)))$$

where:
w(k+n) represents the third point;
$\theta=\csc((i-j)\omega T)$ where $(i-j)\omega T$ does not equal $m\pi$ and m is an integer;
$w_i$ represents the first point;
$w_j$ represents the second point;
i represents a phase of the first point; and
j represents a phase of the second point.

17. The disk drive as recited in claim 13, wherein the servo control system is operable to measure an amplitude of the sinusoidal control signal according to:

$$v|\theta|\sqrt{w_i^2+w_j^2-2w_iw_j\cos((i-j)\omega T)}$$

where:
$\theta=\csc((i-j)\omega T)$ where $(i-j)\omega T$ does not equal $m\pi$ and m is an integer;

$$v = \sqrt{\tau^2 + \gamma^2 + 2\tau\gamma\cos(\omega T)};$$

$w_i$ represents the first point;
$w_j$ represents the second point;
i represents a phase of the first point; and
j represents a phase of the second point.

18. The disk drive as recited in claim 13, wherein the servo control system is operable to measure a phase of the sinusoidal control signal according to:

$$\arctan\left(\frac{\theta(w_j \xi_{i,0}^s - w_i \xi_{j,0}^s)}{\theta(w_j \xi_{i,0}^c - w_i \xi_{j,0}^c)}\right)$$

where:
$\theta=\csc((i-j)\omega T)$ where $(i-j)\omega T$ does not equal $m\pi$ and m is an integer;

$$\begin{bmatrix} \xi_{q,r}^s \\ \xi_{q,r}^c \end{bmatrix} = \begin{bmatrix} \tau\sin(\omega T(q-1)+r) + \gamma\sin(\omega T(q-2)+r) \\ \tau\cos(\omega T(q-1)+r) + \gamma\cos(\omega T(q-2)+r) \end{bmatrix};$$

$w_i$ represents the first point;
$w_j$ represents the second point;
i represents a phase of the first point; and
j represents a phase of the second point.

19. A method of operating a disk drive comprising a disk comprising tracks defined by servo sectors, a head, and a servo control system operable to actuate the head over the disk in response to the servo sectors, the method comprising:
  seeking the head to a first track;
  generating a position error signal (PES) representing a difference between a target location for the head and a measured location for the head;
  adapting a sinusoidal control signal in response to the PES;
  disabling the adapting of the sinusoidal control signal;
  while the adapting is disabled, generating a third point of the sinusoidal control signal based on a first point and second point of the sinusoidal control signal, wherein the first, second and third points correspond to respective servo sectors; and
  generating a feed-forward compensation value based on the third point of the sinusoidal control signal using a feed-forward compensator.

20. The method as recited in claim 19, wherein the third point of the sinusoidal control signal corresponds to the feed-forward compensation value generated while tracking the first track.

21. The method as recited in claim 19, wherein the third point of the sinusoidal control signal corresponds to the feed-forward compensation value generated while seeking the head to a second track.

22. The method as recited in claim 19, wherein:
  the tracks are grouped together to define a plurality of zones, including a first zone and a second zone;
  the first track is located in the first zone, a second track is located in the second zone, and a third track is located in the first zone;
  the first and second points correspond to the first track prior to seeking the head from the first track to the second track; and
  the method further comprises:
    seeking the head from the second track to the third track; and
    initializing the feed-forward compensator based on the third point.

23. The method as recited in claim 19, wherein the feed-forward compensator is operable to generate the feed-forward compensation value y(k) according to:

$$y(k)=2\cos(\omega T)*y(k-1)-y(k-2)+\tau e(k-1)+\gamma e(k-2)$$

where:
T represents a sampling period of the servo sectors;
$\omega$ represents a target frequency;
e represents an error signal of the servo control system; and
$\tau$ and $\gamma$ are learning coefficients.

24. The method as recited in claim 23, further comprising generating the third point according to:

$$y(k+n)=\theta(y_j\sin(\omega T(i+n))-y_i\sin(\omega T(j+n)))$$

where:
y(k+n) represents the third point;
$\theta=\csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

25. The method as recited in claim 21, further comprising generating the third point according to:

$$y(k+n)=\theta(y_j\sin(\omega T(i+n))-y_i\sin(\omega T(j+n)))$$

where:
y(k+n) represents the third point;
$\theta=\csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

26. The method as recited in claim 22, further comprising initializing the feed-forward compensator by computing the third point according to:

$$y(k+n)=\theta(y_j\sin(\omega T(i+n))-y_i\sin(\omega T(j+n)))$$

where:
y(k+n) represents the third point;
$\theta=\csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

27. The method as recited in claim 19, further comprising measuring an amplitude of the sinusoidal control signal based on at least two points of the sinusoidal control signal.

28. The method as recited in claim 23, further comprising measuring an amplitude of the sinusoidal control signal according to:

$$|\theta|\sqrt{y_i^2 + y_j^2 - 2y_iy_j\cos((i-j)\omega T)}$$

where:
$\theta=\csc((i-j)\omega T)$ where $(i-j)\omega T$ does not equal $m\pi$ and m is an integer;
$y_i$ represents the first point;
$y_j$ represents the second point;

i represents a phase of the first point; and
j represents a phase of the second point.

29. The method as recited in claim 19, further comprising measuring a phase of the sinusoidal control signal based on at least two points of the sinusoidal control signal.

30. The method as recited in claim 23, further comprising measuring a phase of the sinusoidal control signal according to:

$$\arctan\left(\frac{\theta(y_j\sin(i\omega T) - y_i\sin(j\omega T))}{\theta(y_j\cos(i\omega T) - y_i\cos(j\omega T))}\right)$$

where:
$\theta = \csc((i-j)\omega T)$ where $(i-j)\omega T$ does not equal $m\pi$ and m is an integer;
$y_i$ represents the first point;
$y_j$ represents the second point;
i represents a phase of the first point; and
j represents a phase of the second point.

* * * * *